United States Patent
Misu et al.

(10) Patent No.: US 11,745,744 B2
(45) Date of Patent: Sep. 5, 2023

(54) SYSTEM AND METHOD FOR DETERMINING OBJECT-WISE SITUATIONAL AWARENESS

(71) Applicant: Honda Motor Co., Ltd., Tokyo (JP)

(72) Inventors: Teruhisa Misu, San Jose, CA (US); Chun Ming Samson Ho, San Leandro, CA (US); Kumar Akash, Milpitas, CA (US); Xiaofeng Gao, Los Angeles, CA (US); Xingwei Wu, Sunnyvale, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/551,813

(22) Filed: Dec. 15, 2021

(65) Prior Publication Data

US 2023/0182745 A1   Jun. 15, 2023

(51) Int. Cl.
  *B60W 40/08* (2012.01)
  *B60W 50/08* (2020.01)
  (Continued)

(52) U.S. Cl.
  CPC ............ *B60W 40/08* (2013.01); *B60W 40/04* (2013.01); *B60W 50/085* (2013.01);
  (Continued)

(58) Field of Classification Search
  CPC .... B60W 40/08; B60W 40/04; B60W 50/085; B60W 50/14; B60W 2040/0818;
  (Continued)

(56) References Cited

U.S. PATENT DOCUMENTS 11,269,420 B1 *   3/2022   Marti ................. G06V 20/58
2010/0033333 A1 *  2/2010   Victor ................ G06V 20/597
                                              340/576

(Continued)

OTHER PUBLICATIONS

V. Alonso and P. De La Puente. System transparency in shared autonomy: A mini review. Frontiers in neurorobotics, 12:83, 2018.

(Continued)

*Primary Examiner* — Mohamed Barakat
(74) *Attorney, Agent, or Firm* — RANKIN, HILL & CLARK LLP

(57) ABSTRACT

A system and method for determining object-wise situational awareness that includes receiving data associated with a driving scene of a vehicle, an eye gaze of a driver of the vehicle, and alerts that are provided to the driver of the vehicle. The system and method also includes analyzing the data and extracting features associated with dynamic objects located within the driving scene, the eye gaze of the driver of the vehicle, and the alerts provided to the driver of the vehicle. The system and method additionally includes determining a level of situational awareness of the driver with respect to the each of the dynamic objects based on the features. The system and method further includes communicating control signals to electronically control at least one component of the vehicle based on the situational awareness of the driver.

20 Claims, 5 Drawing Sheets

(51) Int. Cl.
| | |
|---|---|
| B60W 50/14 | (2020.01) |
| B60W 40/04 | (2006.01) |
| G01S 17/931 | (2020.01) |
| G06V 20/58 | (2022.01) |
| G06F 3/01 | (2006.01) |
| B60W 50/00 | (2006.01) |

(52) U.S. Cl.
CPC ........... *B60W 50/14* (2013.01); *G01S 17/931* (2020.01); *G06F 3/013* (2013.01); *G06V 20/58* (2022.01); *B60W 2040/0818* (2013.01); *B60W 2050/0054* (2013.01); *B60W 2050/0083* (2013.01); *B60W 2050/143* (2013.01); *B60W 2050/146* (2013.01); *B60W 2540/225* (2020.02); *B60W 2540/229* (2020.02); *B60W 2554/406* (2020.02)

(58) Field of Classification Search
CPC . B60W 2050/0054; B60W 2050/0083; B60W 2050/143; B60W 2050/146; B60W 2540/225; B60W 2540/229; B60W 2554/406; G01S 17/931; G06F 3/013; G06V 20/58
See application file for complete search history.

(56) References Cited

U.S. PATENT DOCUMENTS

| | | | | |
|---|---|---|---|---|
| 2019/0213429 | A1* | 7/2019 | Sicconi | G06F 3/0346 |
| 2020/0333439 | A1* | 10/2020 | Mahajan | G01S 7/4802 |
| 2022/0089187 | A1* | 3/2022 | Lefevre | G01S 17/86 |
| 2022/0327183 | A1* | 10/2022 | Russo | G06F 30/20 |

OTHER PUBLICATIONS

M. Ananny and K. Crawford. Seeing without knowing: Limitations of the transparency ideal and its application to algorithmic accountability. new media & society, 20(3):973-989, 2018.
C. A. Bolstad. Situation awareness: does it change with age? In Proceedings of the human factors and ergonomics society annual meeting, vol. 45, pp. 272-276. SAGE Publications Sage CA: Los Angeles, CA, 2001.
M. Colley, B. Eder, J. O. Rixen, and E. Rukzio. Effects of semantic segmentation visualization on trust, situation awareness, and cognitive load in highly automated vehicles. In Proceedings of the 2021 CHI Conference on Human Factors in Computing Systems, pp. 1-11, 2021.
C. Dominguez, M. Vidulich, E. Vogel, G. McMillan, et al. Situation awareness: Papers and annotated bibliography. Armstrong Laboratory, Human System Centre, 1994.
F. T. Durso, C. A. Hackworth, T. R. Truitt, J. Crutchfield, D. Nikolic, and C. A. Manning. Situation awareness as a predictor of performance for en route air traffic controllers. Air Traffic Control Quarterly, 6(1):1-20, 1998.
M. R. Endsley. Design and evaluation for situation awareness enhancement. In Proceedings of the Human Factors Society annual meeting, vol. 32, pp. 97-101. Sage Publications Sage CA: Los Angeles, CA, 1988.
M. R. Endsley. Predictive utility of an objective measure of situation awareness. In Proceedings of the Human Factors Society annual meeting, vol. 34, pp. 41-45. SAGE Publications Sage CA: Los Angeles, CA, 1990.
M. R. Endsley and C. A. Bolstad. Individual differences in pilot situation awareness. The International Journal of Aviation Psychology, 4(3):241-264, 1994.
M. L. Fracker. Measures of situation awareness: Review and future directions. 1991.
A. Heenan, C. M. Herdman, M. S. Brown, and N. Robert. Effects of conversation on situation awareness and working memory in simulated driving. Human factors, 56(6):1077-1092, 2014.
T. Helldin. Transparency for Future Semi-Automated Systems: Effects of transparency on operator performance, workload and trust. PhD thesis, Örebro Universitet, 2014.
J.-Y. Jian, A. M. Bisantz, and C. G. Drury. Foundations for an empirically determined scale of trust in automated systems. International journal of cognitive ergonomics, 4(1):53-71, 2000.
K. R. Johannsdottir and C. M. Herdman. The role of working memory in supporting drivers' situation awareness for surrounding traffic. Human factors, 52(6):663-673, 2010.
P. Lindemann, T.-Y. Lee, and G. Rigoll. Catch my drift: Elevating situation awareness for highly automated driving with an explanatory windshield display user interface Multimodal Technologies and Interaction, 2(4):71, 2018.
S. Liu, X. Wanyan, and D. Zhuang. Modeling the situation awareness by the analysis of cognitive process. Bio-medical materials and engineering, 24(6):2311-2318, 2014.
W. W. Nelson and G. R. Loftus. The functional visual field during picture viewing. Journal of Experimental Psychology Human Learning and Memory, 6(4):391, 1980.
M. T. Phan, I. Thouvenin, and V. Fremont. Enhancing the driver awareness of pedestrian using augmented reality cues. In 2016 IEEE 19th International Conference on Intelligent Transportation Systems (ITSC), pp. 1298-1304. IEEE, 2016.
N. Quinn, L. Csincsik, E. Flynn, C. A. Curcio, S. Kiss, S. R. Sadda, R. Hogg, T. Peto, and I. Lengyel. The clinical relevance of visualizing the peripheral retina. Progress in retinal and eye research, 68:83-109, 2019.
K. Rayner and M. Castelhano. Eye movements. Scholarpedia, 2(10):3649, 2007.
P. Salmon, N. Stanton, G. Walker, and D. Green. Situation awareness measurement: A review of applicability for c4i environments. Applied ergonomics, 37(2):225-238, 2006.
N. B. Sarter and D. D. Woods. How in the world did we ever get into that mode? mode error and awareness in supervisory control. Human factors, 37(1):5-19, 1995.
S. Shah, D. Dey, C. Lovett, and A. Kapoor. Airsim: High-fidelity visual and physical simulation for autonomous vehicles. In Field and service robotics, pp. 621-635. Springer, 2018.
D. Sirkin, N. Martelaro, M. Johns, and W. Ju. Toward measurement of situation awareness in autonomous vehicles. In Proceedings of the 2017 CHI Conference on Human Factors in Computing Systems, pp. 405-415, 2017.
Y. Tong and B. Jia. An augmented-reality-based warning interface for pedestrians: User interface design and evaluation. In Proceedings of the Human Factors and Ergonomics Society Annual Meeting, vol. 63, pp. 1834-1838. SAGE Publications Sage CA: Los Angeles, CA, 2019.
C. Vondrick, D. Patterson, and D. Ramanan. Efficiently scaling up crowdsourced video annotation. International journal of computer vision, 101(1):184 204, 2013.
W. L. Waag and M. R. Houck. Tools for assessing situational awareness in an operational fighter environment. Aviation, space, and environmental medicine, 1994.
J. Wang, W. Wang, P. Hansen, Y. Li, and F. You. The situation awareness and usability research of different hud hmi design in driving while using adaptive cruise control. In International Conference on Human-Computer Interaction, pp. 236-248. Springer, 2020.
C. D. Wickens, J. S. McCarley, A. L. Alexander, L. C. Thomas, M. Ambinder, and S. Zheng. Attention-situation awareness (a-sa) model of pilot error. Human performance modeling in aviation, pp. 213-239, 2008.
Y. Yang, B. Karakaya, G. C. Dominioni, K. Kawabe, and K. Bengler. An hmi concept to improve driver's visual behavior and situation awareness in automated vehicle. In 2018 21st International Conference on Intelligent Transportation Systems (ITSC), pp. 650-655. IEEE, 2018.
Y. Barnard and F. Lai. Spotting sheep in yorkshire: Using eye-tracking for studying situation awareness in a driving simulator. In Human Factors: A System View of Human, Technology and Organisation. Annual Conference of the Europe Chapter of the Human Factors and Ergonomics Society 2009, 2010.

(56) References Cited

OTHER PUBLICATIONS

M. R. Endsley. Situation awareness global assessment technique (sagat). In Proceedings of the IEEE 1988 national aerospace and electronics conference, pp. 789-795. IEEE, 1988.
S. international. Taxonomy and definitions for terms related to driving automation systems for on-road motor vehicles. SAE, 2018.
C. Merenda, H. Kim, K. Tanous, J. L. Gabbard, B. Feichtl, T. Misu, and C. Suga. Augmented reality interface design approaches for goaldirected and stimulus-driven driving tasks. IEEE transactions on visualization and computer graphics, 24(11):2875-2885, 2018.
L. Shuang, W. Xiaoru, and Z. Damin. A quantitative situational awareness model of pilot. In Proceedings of the International Symposium on Human Factors and Ergonomics in Health Care, vol. 3, pp. 117-122. SAGE Publications Sage CA: Los Angeles, CA, 2014.
R. Taylor. Situational awareness rating technique (sart): The development of a tool for aircrew systems design. situational awareness in aerospace operations (agard-cp-478) Neuilly Sur Seine, France: NATO-AGARD, 1990.
C. D. Wickens. Situation awareness and workload in aviation. Current directions in psychological science, 11(4):128-133, 2002.

\* cited by examiner

SYSTEM AND METHOD FOR DETERMINING OBJECT-WISE SITUATIONAL AWARENESS

BACKGROUND

With improvements in sensing technologies, recent intelligent vehicles have been equipped with advanced driver assistance systems (ADASs) as standard features. In many instances, such systems may provide visual warnings to alert a driver of important external information with respect to additional vehicles, pedestrians, and the like that may be traveling within the surrounding environment of a vehicle. However, displaying a higher number of warnings may increase the driver's workload and may potentially overwhelm the driver. Accordingly, to maintain the workload at a low level, it may be necessary to limit the amount of information provided to the driver.

BRIEF DESCRIPTION

According to one aspect, a computer-implemented method for determining object-wise situational awareness that includes receiving data associated with a driving scene of a vehicle, an eye gaze of a driver of the vehicle, and alerts that are provided to the driver of the vehicle. The computer-implemented method also includes analyzing the data and extracting features associated with dynamic objects located within the driving scene, the eye gaze of the driver of the vehicle, and the alerts provided to the driver of the vehicle. The computer-implemented method additionally includes determining a level of situational awareness of the driver with respect to the each of the dynamic objects based on the features. The computer-implemented method further includes communicating control signals to electronically control at least one component of the vehicle based on the situational awareness of the driver.

According to another aspect, a system for determining object-wise situational awareness that includes a memory storing instructions when executed by a processor cause the processor to receive data associated with a driving scene of a vehicle, an eye gaze of a driver of the vehicle, and alerts that are provided to the driver of the vehicle. The instructions also cause the processor to analyze the data and extracting features associated with dynamic objects located within the driving scene, the eye gaze of the driver of the vehicle, and the alerts provided to the driver of the vehicle. The instructions additionally cause the processor to determine a level of situational awareness of the driver with respect to the each of the dynamic objects based on the features. The instructions further cause the processor to communicate control signals to electronically control at least one component of the vehicle based on the situational awareness of the driver.

According to yet another aspect, a non-transitory computer readable storage medium storing instructions that when executed by a computer, which includes a processor perform a method, the method that includes receiving data associated with a driving scene of a vehicle, an eye gaze of a driver of the vehicle, and alerts that are provided to the driver of the vehicle. The method also includes analyzing the data and extracting features associated with dynamic objects located within the driving scene, the eye gaze of the driver of the vehicle, and the alerts provided to the driver of the vehicle. The method additionally includes determining a level of situational awareness of the driver with respect to the each of the dynamic objects based on the features. The method further includes communicating control signals to electronically control at least one component of the vehicle based on the situational awareness of the driver.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures can be shown in exaggerated or generalized form in the interest of clarity and conciseness. The disclosure itself, however, as well as a preferred mode of use, further objects and advances thereof, will be best understood by reference to the following detailed description of illustrative embodiments when read in conjunction with the accompanying drawings, wherein:

DETAILED DESCRIPTION

Figure 1:
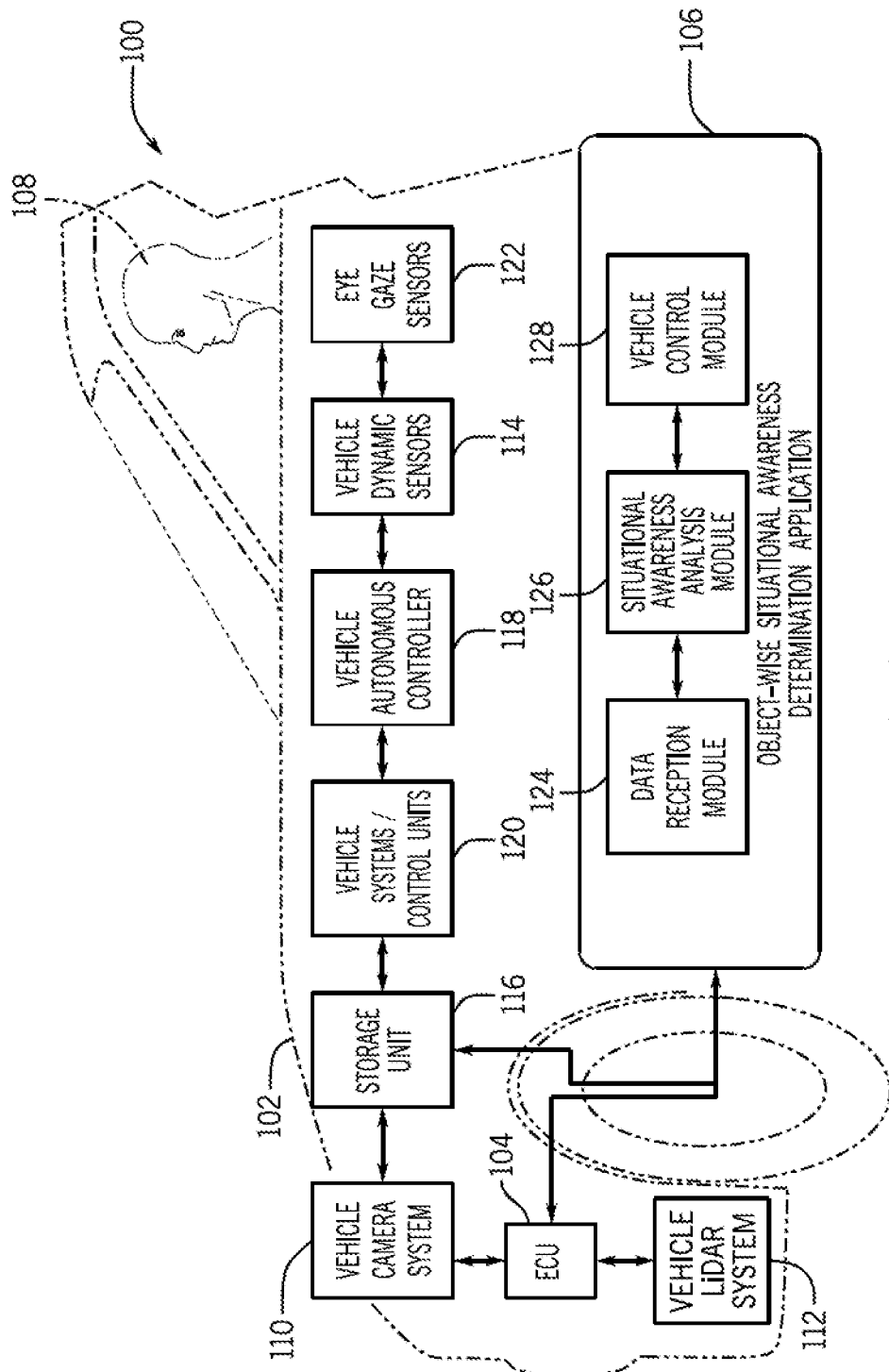
FIG. 1 is a schematic view of an exemplary system for determining object-wise situational awareness according to an exemplary embodiment of the present disclosure.

The following includes definitions of selected terms employed herein. The definitions include various examples and/or forms of components that fall within the scope of a term and that may be used for implementation. The examples are not intended to be limiting.

A "bus", as used herein, refers to an interconnected architecture that is operably connected to other computer components inside a computer or between computers. The bus may transfer data between the computer components. The bus may be a memory bus, a memory controller, a peripheral bus, an external bus, a crossbar switch, and/or a local bus, among others. The bus can also be a vehicle bus that interconnects components inside a vehicle using protocols such as Media Oriented Systems Transport (MOST), Controller Area network (CAN), Local Interconnect Network (LIN), among others.

"Computer communication", as used herein, refers to a communication between two or more computing devices (e.g., computer, personal digital assistant, cellular telephone, network device) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "disk", as used herein can be, for example, a magnetic disk drive, a solid-state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

A "memory", as used herein can include volatile memory and/or non-volatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DR-RAM). The memory can store an operating system that controls or allocates resources of a computing device.

A "module", as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module may also include logic, a software-controlled microprocessor, a discreet logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

An "operable connection", or a connection by which entities are "operably connected", is one in which signals, physical communications, and/or logical communications may be sent and/or received. An operable connection may include a wireless interface, a physical interface, a data interface and/or an electrical interface.

A "processor", as used herein, processes signals and performs general computing and arithmetic functions. Signals processed by the processor may include digital signals, data signals, computer instructions, processor instructions, messages, a bit, a bit stream, or other means that may be received, transmitted and/or detected. Generally, the processor may be a variety of various processors including multiple single and multicore processors and co-processors and other multiple single and multicore processor and co-processor architectures. The processor may include various modules to execute various functions.

A "vehicle", as used herein, refers to any moving vehicle that is capable of carrying one or more human occupants and is powered by any form of energy. The term "vehicle" includes, but is not limited to: cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" may refer to an electric vehicle (EV) that is capable of carrying one or more human occupants and is powered entirely or partially by one or more electric motors powered by an electric battery. The EV may include battery electric vehicles (BEV) and plug-in hybrid electric vehicles (PHEV). The term "vehicle" may also refer to an autonomous vehicle and/or self-driving vehicle powered by any form of energy. The autonomous vehicle may or may not carry one or more human occupants. Further, the term "vehicle" may include vehicles that are automated or non-automated with pre-determined paths or free-moving vehicles.

A "value" and "level", as used herein may include, but is not limited to, a numerical or other kind of value or level such as a percentage, a non-numerical value, a discrete state, a discrete value, a continuous value, among others. The term "value of X" or "level of X" as used throughout this detailed description and in the claims refers to any numerical or other kind of value for distinguishing between two or more states of X. For example, in some cases, the value or level of X may be given as a percentage between 0% and 100%. In other cases, the value or level of X could be a value in the range between 1 and 10. In still other cases, the value or level of X may not be a numerical value, but could be associated with a given discrete state, such as "not X", "slightly x", "x", "very x" and "extremely x".

I. System Overview

Referring now to the drawings, wherein the showings are for purposes of illustrating one or more exemplary embodiments and not for purposes of limiting same, FIG. 1 is a schematic view of an exemplary system 100 for determining object-wise situational awareness according to an exemplary embodiment of the present disclosure. The components of the system 100, as well as the components of other systems, hardware architectures, and software architectures discussed herein, may be combined, omitted, or organized into different architectures for various embodiments.

Generally, the system includes a vehicle 102 that includes an electronic control unit (ECU) 104 that executes one or more applications, operating systems, vehicle system and subsystem user interfaces, among others. The ECU 104 may also execute an Object-wise situational awareness determination application (situational awareness application) 106 that may be configured to determine object-wise situational awareness of a driver 108 of the vehicle 102 that is operating within a driving scene 200 of the vehicle 102. The situational awareness application 106 may be configured to determine the driver's situational awareness with respect to dynamic objects (e.g., additional vehicles, pedestrians) that may be located within the driving scene 200 of the vehicle 102. The driver's situational awareness may be determined as a level (e.g., value) that may pertain to the driver's awareness, attention, and/or allocation to driving related workload to dynamic objects that may be located and traveling within the driving scene 200 of the vehicle 102.

Figure 2:
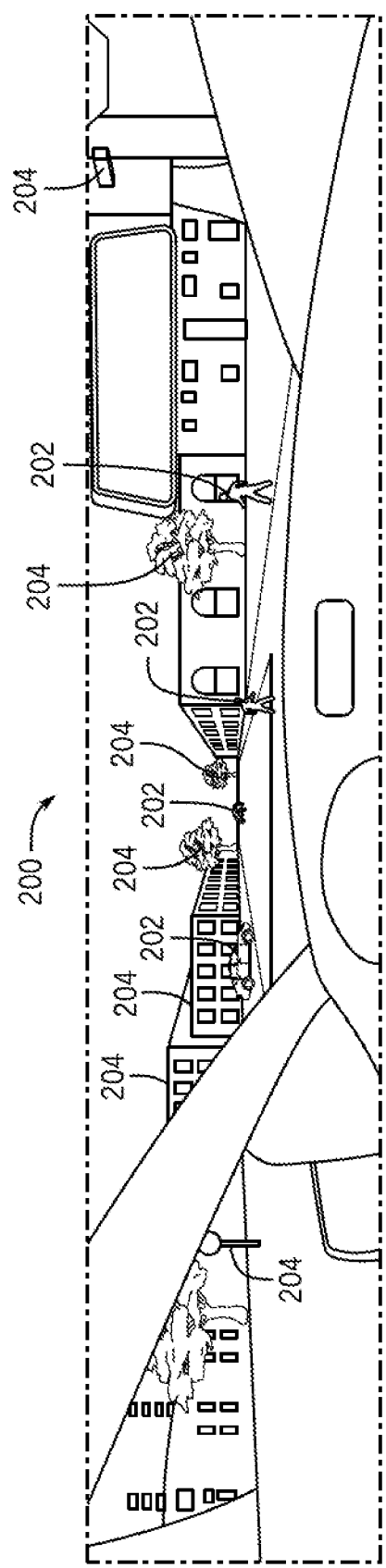
FIG. 2 is an illustrative example of a driving scene of a vehicle that includes static objects and dynamic objects according to an exemplary embodiment of the present disclosure.

As shown in the illustrative example of FIG. 2, as the vehicle 102 is driven in a driving scene 200 of the vehicle 102 which may include roadways, intersections, sidewalks, dynamic objects 202 (e.g., pedestrians, other vehicles, etc.), static objects 204 (e.g., traffic posts, traffic lights, buildings, trees, guardrails, etc.), data may be captured regarding the driving scene 200 of the vehicle 102. As discussed in more detail below, the situational awareness application 106 may be configured to classify objects located within the driving scene 200 as particular types of dynamic objects 202 and static objects 204 and further determine the number and position of dynamic objects 202 that may be traveling within the driving scene 200.

In one embodiment, the situational awareness application 106 may be configured to analyze the number of dynamic objects 202 that may be located within the driving scene 200 and may determine a traffic density of the driving scene 200. Additionally, the situational awareness application 106 may be configured to identify each of the dynamic objects 202 that are located within the driving scene 200 and may determine a visual attention value that may pertain to a level of visual attention that the driver 108 of the vehicle 102 may place upon each dynamic object 202 that may be located within the driving scene 200 of the vehicle 102. The visual attention value may be based on the relative position of each of the dynamic objects 202 with respect to the position of the vehicle 102 within the driving scene 200 and may pertain to the driver's attention to each of the respective dynamic objects 202.

The situational awareness application 106 may additionally be configured to determine if any alerts (e.g., audio or visual warnings) are provided to the driver 108 of the vehicle 102 through one or more advanced driver assist systems (ADAS) (not shown) that may be attributed to the sensed presence and position of one or more of the dynamic objects 202 as sensed by one or more cameras (not shown) of a vehicle camera system 110 and/or LiDAR sensors (not shown) of a vehicle LiDAR system 112 that may also influence the driver's attention with respect to one or more of the dynamic objects 202 that may be traveling within the driving scene 200 of the vehicle 102.

Based on the analysis of the traffic density of the driving scene 200, the visual attention value pertaining to visual attention provided towards each of the dynamic objects 202, and the presence of any alerts that may be provided to the driver 108 that may be attributed to the presence and position of one or more of the dynamic objects 202, the situational awareness application 106 may be configured to determine a level of situational awareness of the driver 108 that may be attributed to each of the dynamic objects 202 that may be located within the driving scene 200 of the vehicle 102. Stated differently, the level of situational awareness may be attributed to the awareness of the driver 108 with respect to each of the dynamic objects 202 based on features that are extracted and associated with each of the dynamic objects 202 located within the driving scene 200, the driver's attention placed towards one or more respective dynamic objects 202, and a level of alert associated with one or more of the dynamic objects 202.

In one embodiment, the situational awareness application 106 may be configured to compare the level of situational awareness of the driver 108 that is attributed to each of the dynamic objects 202 that may be located within the driving scene 200 and may compare the level of situational awareness that is attributed to each of the dynamic objects 202 to a situational awareness threshold value. The situational awareness threshold value may be associated with a requisite level of situational awareness that may be utilized to determine which dynamic objects 202 are to be considered when providing vehicle controls to account for dynamic objects 202 that the driver 108 of the vehicle 102 may not be highly aware of within the driving scene 200.

In some embodiments, the situational awareness threshold value may be a dynamic value that may be determined by the situational awareness application 106 based on one or more threshold variance factors that apply to situational attributes that may be associated with the operation of the vehicle 102, the driving scene 200, and/or driving conditions of the driving scene 200 at one or more time steps. The one or more threshold variance factors may include, but may not be limited to, the particular vehicle dynamics of the vehicle 102 (e.g., speed, braking, steering angle, etc.) at one or more time steps, a type of driving scene (e.g., highway, intersection, two-lane road, off-ramp) at the one or more time steps, and/or driving conditions (e.g., weather, traffic density, road conditions) of the driving scene 200 of the vehicle 102 at the one or more time steps.

As discussed below, the level of situational awareness of the driver 108 that may be attributed to the awareness of the driver 108 with respect to each of the dynamic objects 202 may be compared to the situational awareness threshold value to determine if the driver 108 has a lower situational awareness of one or more dynamic objects 202 than the situational awareness threshold value. If it is determined that the driver 108 has a lower situational awareness that is attributed to the presence of particular dynamic objects 202 within the driving scene 200, the situational awareness application 106 may be configured to provide one or more alert warnings that are displayed within the vehicle 102 to highlight one or more dynamic objects 202 that may be located at a relative predetermined position of the vehicle 102 (e.g., in an adjacent lane, within a threshold distance in the front, back, or sides of the vehicle 102), that may be located within a projected pathway of the vehicle 102, and that may be associated with the lower situational awareness of the driver 108.

Stated differently, the situational awareness application 106 may provide a human machine interface (HMI) within the vehicle 102 that may selectively alert the driver 108 of one or more dynamic objects 202 (e.g., additional vehicles, pedestrians, bicyclists, etc.) that may be located within the driving scene 200 that the driver 108 may have a lower level of situational awareness of and that may impact the operation of the vehicle 102 as the driver 108 operates the vehicle 102 within the driving scene 200. In additional embodiments, the situational awareness application 106 may provide autonomous vehicle controls to autonomously or semi-autonomously operate the vehicle 102 to account for one or more dynamic objects 202 that may be located at a relative predetermined position of the vehicle 102 (e.g., in an adjacent lane, within a threshold distance in the front, back, or sides of the vehicle 102), that may be located within a projected pathway of the vehicle 102, and that may be associated with the lower situational awareness of the driver 108.

The present disclosure accordingly describes a system and method that allows an improvement to a computer and the technology with respect to improving situational awareness of vehicle drivers and enabling the utilization of smart driver-assistance interfaces and/or vehicle controls that account for objects that drivers may not be attentive towards or be aware of while operating vehicles within various driving environments. This functionality thereby improves driver situation awareness by situationally and selectively providing smart driver-assistance interfaces and/or vehicle controls that pertain to relevant dynamic objects 202 that may be located at a relative predetermined position of the vehicle 102, that may be located within a projected pathway of the vehicle 102, and that may be associated with the lower situational awareness of the driver 108.

With continued reference to FIG. 1, the ECU 104 may be configured to be operably connected to a plurality of additional components of the vehicle 102, including the vehicle camera system 110, the vehicle LiDAR system 112, eye gaze sensors 122, a storage unit 116, a vehicle autonomous controller 118, and vehicle systems/control units 120 of the vehicle 102. In one or more embodiments, the ECU 104 may include a microprocessor, one or more application-specific integrated circuit(s) (ASIC), or other similar devices. The ECU 104 may also include internal processing memory, an interface circuit, and bus lines for transferring data, sending commands, and communicating with the plurality of components of the vehicle 102.

The ECU 104 may also include a communication device (not shown) for sending data internally within (e.g., between one or more components) the vehicle 102 and communicating with externally hosted computing systems (e.g., external to the vehicle 102). Generally, the ECU 104 may communicate with the storage unit 116 to execute the one or more applications, operating systems, vehicle system and subsystem user interfaces, and the like that are stored within the storage unit 116.

In one embodiment, the ECU 104 may communicate with the vehicle autonomous controller 118 to execute autonomous driving commands to operate the vehicle 102 to be fully autonomously driven or semi-autonomously driven in a particular manner. As discussed below, the autonomous driving commands may be based on commands provided by the situational awareness application 106 to navigate the vehicle 102 within the driving scene 200 to autonomously control one or more functions of the vehicle 102 to account for the driver's situational awareness with respect to respective dynamic objects 202 that are located within the driving scene 200 of the vehicle 102.

As discussed below, based on one or more executable command instructions that may be communicated by the situational awareness application 106, the vehicle autonomous controller 118 may be configured to autonomously control the vehicle 102 to operate in a manner based on the one or more commands that are output by the situational awareness application 106. For example, the situational awareness application 106 may send autonomous control commands to the vehicle autonomous controller 118 to ensure that the vehicle 102 is autonomously operated to complete acceleration, braking, and/or steering in a way that accounts for dynamic objects 202 that may be determined to be associated with a lower level of situational awareness that may indicate a lower awareness level with respect to the driver's awareness of the respective dynamic objects 202.

The ECU 104 may also include a communication device (not shown) for sending data internally within (e.g., between one or more components) the vehicle 102 and communicating with externally hosted computing systems (e.g., external to the vehicle 102). Generally, the ECU 104 may communicate with the storage unit 116 to execute the one or more applications, operating systems, vehicle system and subsystem user interfaces, and the like that are stored within the storage unit 116.

In one embodiment, the ECU 104 may communicate with the vehicle autonomous controller 118 to execute autonomous driving commands to operate the vehicle 102 to be fully autonomously driven or semi-autonomously driven in a particular manner. As discussed below, the autonomous driving commands may be based on commands provided by the situational awareness application 106 to navigate the vehicle 102 within the driving scene 200 to autonomously control one or more functions of the vehicle 102 to account for the driver's situational awareness with respect to respective dynamic objects 202 that are located within the driving scene 200 of the vehicle 102.

As discussed below, based on one or more executable command instructions that may be communicated by the situational awareness application 106, the vehicle autonomous controller 118 may be configured to autonomously control the vehicle 102 to operate in a manner based on the one or more commands that are output by the situational awareness application 106. For example, the situational awareness application 106 may send autonomous control commands to the vehicle autonomous controller 118 to ensure that the vehicle 102 is autonomously operated to complete acceleration, braking, and/or steering in a way that accounts for dynamic objects 202 that may be associated with a lower awareness level with respect to the driver's awareness of the respective dynamic objects 202.

In one or more embodiments, the vehicle autonomous controller 118 may autonomously control the operation of the vehicle 102 by providing one or more commands to one or more of the vehicle systems/control units 120 to provide full autonomous or semi-autonomous control of the vehicle 102 to follow vehicle autonomous commands provided by the application 106. Such autonomous control of the vehicle 102 may be provided by sending one or more commands to control one or more of the vehicle systems/control units 120 to operate (e.g., drive) the vehicle 102 during one or more circumstances (e.g., when providing driver assist controls), and/or to fully control driving of the vehicle 102.

The one or more commands may be provided to one or more vehicle systems/control units 120 that include, but are not limited to a head unit, an engine control unit, a braking control unit, a transmission control unit, a steering control unit, and the like to control the output of one or more ADAS notifications and/or to control the vehicle 102 to be autonomously driven based on one or more autonomous commands that are output by the situational awareness application 106. Accordingly, the one or more vehicle systems/control units 120 may provide graphical visual alerts and/or audio alerts, autonomous control, and/or semi-autonomous control to assist in navigating the vehicle 102 within the driving scene 200 of the vehicle 102 while accounting for one or more dynamic objects 202 that may be located within the driving scene 200 of the vehicle 102.

In one embodiment, the head unit of the vehicle 102 may include one or more display devices (e.g., center stack display device, head-up display) and audio devices (e.g., speakers) (not shown) that may provide ADAS alerts that pertain to dynamic objects 202 that may be within a particular distance of the vehicle 102, within a blind spot of the driver 108 of the vehicle 102, and/or within a projected path of the vehicle 102. Such ADAS alerts may include graphical alerts or audio alerts that may be provided to alert of the driver 108 of the presence of such dynamic objects 202. In one or more embodiments, the one or more vehicle systems/control units 120 may be configured to provide alert data to the situational awareness application 106 that pertains to the types of alerts and the reasons for such alerts associated with one or more dynamic objects 202 (e.g., presence of a particular dynamic object 202 within a close distance to the vehicle 102) that may be provided to the driver 108 at one or more particular points in time.

The alert data may be analyzed by the situational awareness application 106 to determine if any alerts are provided to the driver of the vehicle 102 that may be attributed to the sensed presence and position of one or more of the dynamic objects 202. As discussed below, such information may be utilized in addition to the traffic density within the driving scene 200 and the visual attention value that may pertain to a level of visual attention that the driver 108 of the vehicle 102 may place upon each dynamic object 202 that may be located within the driving scene 200 of the vehicle 102 to determine the level of situational awareness of the driver 108 with respect to each dynamic object 202 within the driving scene 200.

In one embodiment, upon determining a lower level of situational awareness of the driver 108 (i.e., where the level of situational awareness is lower than the situational awareness threshold value) with respect to one or more particular dynamic objects 202, the situational awareness application 106 may be configured to communicate one or more commands to the one or more vehicle systems/control units 120 to control ADAS of the vehicle 102 to provide one or more alerts and/or warnings that may pertain to the presence and/or positions of one or more dynamic objects 202 to account for the dynamic objects 202 that may be associated with a lower level of situational awareness with respect to the driver's awareness of the respective dynamic objects 202 within the driving scene 200. In one configuration, the one or more display devices may provide a visual representation of the driving scene 200 and may provide a graphical highlight over one or more dynamic objects 202 that may be located at a relative predetermined position of the vehicle 102, that may be located within a projected pathway of the vehicle 102, and that may be associated with the lower level of situational awareness of the driver 108. Accordingly, the driver 108 of the vehicle 102 may be presented with such information to enhance the driver's situational awareness with respect to one or more dynamic objects 202 that the driver 108 may not be highly aware of.

In one or more embodiments, the vehicle systems/control units 120 may be operably connected to the vehicle dynamic sensors 114 of the vehicle 102. The vehicle dynamic sensors 114 may be configured to receive inputs from one or more vehicle systems, sub-systems, control systems, and the like. In one embodiment, the vehicle dynamic sensors 114 may be included as part of a Controller Area Network (CAN) of the vehicle 102 and may be configured to provide vehicle dynamic data to the ECU 104 to be utilized for one or more vehicle systems, sub-systems, control systems, and the like. The vehicle dynamic sensors 114 may include, but may not be limited to, position sensors, heading sensors, speed sensors, steering speed sensors, steering angle sensors, throttle angle sensors, accelerometers, magnetometers, gyroscopes, yaw rate sensors, brake force sensors, wheel speed sensors, wheel turning angle sensors, transmission gear sensors, temperature sensors, RPM sensors, GPS/DGPS sensors, and the like (individual sensors not shown).

In one configuration, the vehicle dynamic sensors 114 may provide dynamic data in the form of one or more values (e.g., numeric levels) that are associated with the real-time dynamic performance of the vehicle 102 as one or more driving maneuvers are conducted and/or as the vehicle 102 is controlled to be autonomously driven. As discussed below, dynamic data that is output by the vehicle dynamic sensors 114 may be associated with a real time dynamic operation of the vehicle 102 as it is traveling within the driving scene 200. The dynamic data may be analyzed by the situational awareness application 106 to determine dynamic constraints associated with the vehicle 102 to thereby autonomously control the vehicle 102 to operate based on such constraints. In some embodiments, the dynamic data may also be analyzed by the situational awareness application 106 to influence the situational awareness threshold value as a dynamic value that may be determined based on the particular vehicle dynamics of the vehicle 102 at a particular point in time.

With continued reference to FIG. 1, the vehicle camera system 110 may include one or more of the cameras (not shown) that may be positioned in one or more directions and at one or more areas to capture one or more images of the driving scene 200 of the vehicle 102 (e.g., images of the roadway on which the vehicle 102 is traveling). The one or more cameras of the vehicle camera system 110 may be disposed at external front portions of the vehicle 102, including, but not limited to different portions of a vehicle dashboard, a vehicle bumper, vehicle front lighting units, vehicle fenders, and a vehicle windshield. In one embodiment, the one or more cameras may be configured as RGB cameras that may capture RGB bands that are configured to capture rich information about object appearance, as well as relationships and interactions between the vehicle 102 and objects 202, 204 within the driving scene 200 of the vehicle 102.

In other embodiments, the one or more cameras may be configured as stereoscopic cameras that are configured to capture environmental information in the form of three-dimensional images. In one or more configurations, the one or more cameras may be configured to capture one or more first person viewpoint RGB images/videos of the driving scene 200. The vehicle camera system 110 may be configured to convert one or more RGB images/videos (e.g., sequences of images) into image data that is communicated to the situational awareness application 106 to be analyzed.

In an exemplary embodiment, the vehicle LiDAR system 112 may be operably connected to one or more LiDAR sensors. In particular, the vehicle LiDAR system 112 may include one or more planar sweep lasers that include respective three-dimensional LiDAR sensors that may be configured to oscillate and emit one or more laser beams of ultraviolet, visible, or near infrared light toward the driving scene 200 of the vehicle 102. The one or more LiDAR sensors may be configured to receive one or more reflected laser waves (e.g., signals) that are reflected off one or more objects 202, 204 such as surrounding vehicles, pedestrians, street signs, traffic infrastructure, and the like that may be located within the driving scene 200 of the vehicle 102. In other words, upon transmitting the one or more laser beams to the driving scene 200, the one or more laser beams may be reflected as laser waves by one or more obstacles that include static objects 204 and/or dynamic objects 202 that may be located within the driving scene 200 of the vehicle 102 at one or more points in time.

In one embodiment, the vehicle LiDAR system 112 may be configured to analyze the reflected laser waves and output respective LiDAR data to the situational awareness application 106. The LiDAR data may include LiDAR coordinates that may be associated with the locations, positions, depths, and/or dimensions (e.g., measurements) of one or more dynamic objects 202 such as the surrounding vehicles and pedestrians that may be traveling (moving) within the driving scene 200.

As discussed below, image data provided by the vehicle camera system 110 and/or the LiDAR data provided by the vehicle LiDAR system 112 may be communicated to the situational awareness application 106 to be analyzed against the one or more object classifiers to classify the static objects 204 and the dynamic objects 202 located within the driving scene 200. In some embodiments, the image data provided by the vehicle camera system 110 and/or the LiDAR data provided by the vehicle LiDAR system 112 may be aggregated and analyzed to determine the relative positions of the static objects 204 and dynamic objects 202 with respect to the position of the vehicle 102 within the driving scene 200.

In an exemplary embodiment, the eye gaze sensors 122 may be configured as one or more cameras located within the vehicle 102 and hardware configured to interpret video or image data sensed by the camera(s) to detect the driver's eye positions within the vehicle 102 in order to determine the driver's gaze points. In an alternate embodiment, the eye gaze sensors 122 may be included as part of a wearable device (e.g., wearable glasses) that may be configured to detect the driver's eye positions within the vehicle 102 in order to determine the driver's gaze points as the vehicle 102 is being operated within the driving scene 200. The driver's gaze points may pertain to the driver's focus with respect to the driver's foveal, parafoveal, and peripheral vision of the driving scene 200 with respect to one the driving scene 200 of the vehicle 102.

In one embodiment, the eye gaze sensors 122 may communicate eye gaze data that pertains to the driver's gaze focus with respect to the driver's foveal, parafoveal, and peripheral vision of the driving scene 200 to the situational awareness application 106. The situational awareness application 106 may be configured to analyze the eye gaze data that pertains to the driver's gaze focus with respect to the driver's foveal, parafoveal, and peripheral vision of the driving scene 200 to extract a plurality of gaze point based features. In one embodiment, the analysis of the eye gaze data may include interpreting the foveal region of the driver's vision to extend out to an angle of eccentricity of 1 degree and the parafoveal region from 1 to 5 degrees.

The analysis may include the interpretation of the foveal and parafoveal regions together as a central vision of the driver 108 and the peripheral region as the remaining area of vision. As discussed in more detail below, the driver's eye gaze may be tracked with respect to one or more dynamic objects 202 that may be traveling within one or more regions of the driving scene 200 based on the analysis of driver's central vision with respect to respective positions of one or more dynamic objects 202 from the perspective of the driver 108 seated within the vehicle 102.

In one configuration, the eye gaze data may be analyzed along with image data that may be provided by the vehicle camera system 110 and LiDAR data that may be provided by the vehicle LiDAR system 112 to analyze the eye gaze of the driver 108 with respect to the position of each of the dynamic objects 202 that may be located within the driving scene 200 of the vehicle 102. In one embodiment, the eye gaze data, image data, and LiDAR data may be analyzed to determine eye gaze object characteristics that may be based on the tracked eye gaze of the driver 108 that may include, but may not be limited to, a distance with respect to one or more respective dynamic objects 202 that may be located within portions of the driving scene 200 that are included within the central vision of the driver 108 within one or more time steps, the number of dynamic objects 202 that may be included within the central vision of the driver 108 at one or more time steps, a fixation time of the central vision of the driver 108 with respect to the one or more dynamic objects 202 that may be located within one or more portions of the driving scene 200, the relative sizes of the one or more dynamic objects 202 that may be included within the central vision of the driver 108 at one or more time steps, and/or additional attention capturing physical characteristics (e.g., color, shape, speed, trajectory) that may be associated with respect to one or more respective dynamic objects 202 that may be located within the driving scene 200 that are included within the central vision of the driver 108 within one or more time steps. As discussed below, the eye gaze object characteristics may be analyzed to determine a visual attention value that may pertain to a level of visual attention that the driver 108 of the vehicle 102 may place upon each dynamic object 202 that may be located within the driving scene 200 of the vehicle 102 at one or more time steps.

In one or more embodiments, the storage unit 116 of the vehicle 102 may be configured to store one or more executable files associated with one or more operating systems, applications, associated operating system data, application data, vehicle system and subsystem user interface data, and the like that are executed by the ECU 104. In one embodiment, the storage unit 116 may be configured to store eye gaze data, image data, and LiDAR data that may be received by the situational awareness application 106 at one or more points in time. The situational awareness application 106 may access the storage unit 116 to retrieve the eye gaze data, image data, and LiDAR data to classify dynamic objects 202 located within the driving scene 200, determine the relative positions of dynamic objects 202 within the driving scene 200, determine the traffic density of the driving scene 200, and/or determine the visual attention value that may pertain to a level of visual attention that the driver 108 of the vehicle 102 may place upon each dynamic object 202 that may be located within the driving scene 200 of the vehicle 102.

II. The Object-Wise Situational Awareness Determination Application and Related Methods Components of the situational awareness application 106 will now be described according to an exemplary embodiment and with continued reference to FIG. 1. In an exemplary embodiment, the situational awareness application 106 may be stored on the storage unit 116 and executed by the ECU 104 of the vehicle 102. In another embodiment, the situational awareness application 106 may be stored on an externally hosted computing infrastructure and may be accessed by a telematics control unit of the vehicle 102 to be executed by the ECU 104 of the vehicle 102.

The general functionality of the situational awareness application 106 will now be discussed. In an exemplary embodiment, the situational awareness application 106 may include a plurality of modules 124-130 that may be configured to determine object-wise situational awareness. The plurality of modules 124-128 may include a data reception module 124, a situational awareness analysis module 126, and a vehicle control module 128. However, it is appreciated that the situational awareness application 106 may include one or more additional modules and/or sub-modules that are included in lieu of the modules 124-128.

Figure 3:
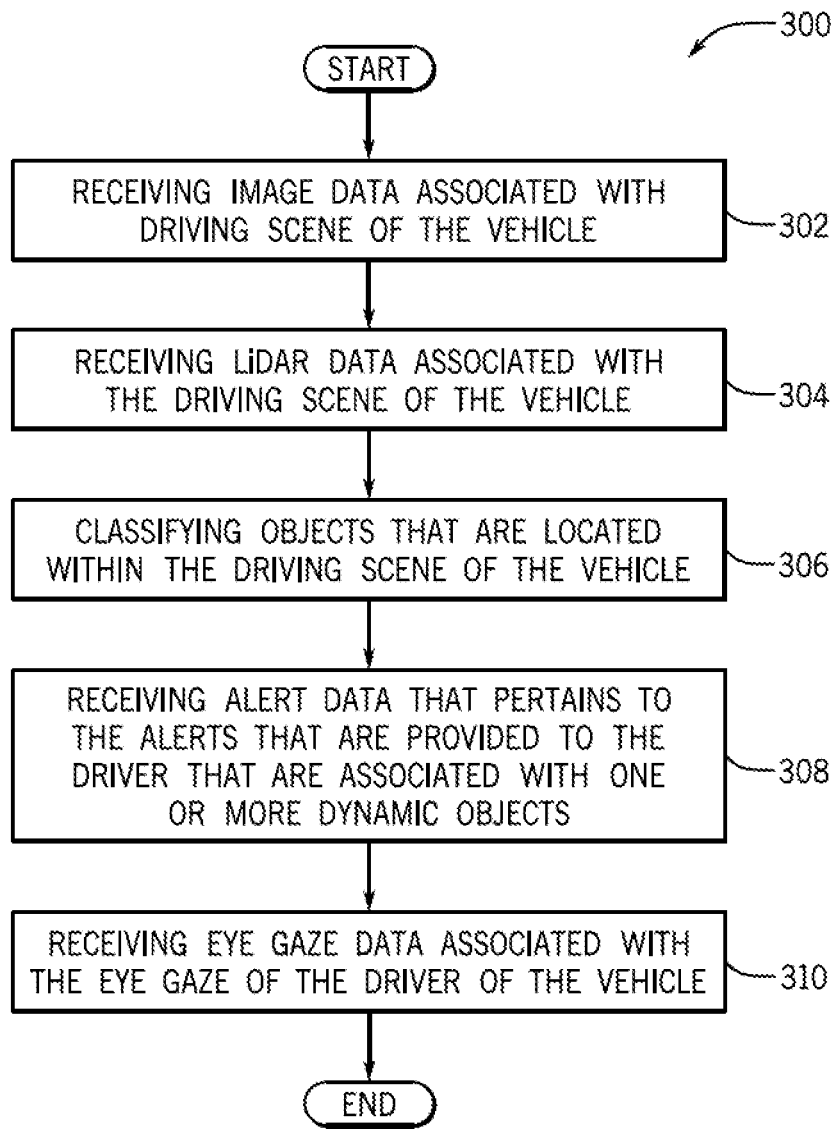
FIG. 3 is a process flow diagram of a method 300 for receiving data associated with the driving scene and a driver of the vehicle according to an exemplary embodiment of the present disclosure.

FIG. 3 is a process flow diagram of a method 300 for receiving data associated with the driving scene and the driver 108 of the vehicle 102 according to an exemplary embodiment of the present disclosure. FIG. 3 will be described with reference to the components of FIG. 1 though it is to be appreciated that the method 300 of FIG. 3 may be used with other systems/components. The method 300 may begin at block 302, wherein the method 300 may include receiving image data associated with the driving scene 200 of the vehicle 102.

In one embodiment, the data reception module 124 of the situational awareness application 106 may be configured to communicate with the vehicle camera system 110 to collect image data associated untrimmed images/video of the driving scene 200 of the vehicle 102. In some configurations, the image data may pertain to one or more first person viewpoint RGB images/videos of the driving scene 200 of the vehicle 102. In particular, the image data may pertain to one or more RGB images/video of the surrounding dynamic objects 202 and static objects 204 that are located within the driving scene 200 that are captured by one or more cameras that are operably connected to the vehicle camera system 110. In some embodiments, the data reception module 124 may package and store the image data on the storage unit 116 to be evaluated at one or more points in time.

The method 300 may proceed to block 304, wherein the method 300 may include receiving LiDAR data associated with the driving scene 200 of the vehicle 102. In an exemplary embodiment, the data reception module 124 may communicate with the vehicle LiDAR system 112 of the vehicle 102 to collect LiDAR data that includes LiDAR based observations from the vehicle 102. The LiDAR based observations may indicate the location, range, and positions of the one or more objects off which the reflected laser waves were reflected with respect to a location/position of the vehicle 102. In some embodiments, the data reception module 124 may package and store the LiDAR data on the storage unit 116 to be evaluated at one or more points in time.

The method 300 may proceed to block 306, wherein the method 300 may include classifying objects 202, 204 that are located within the driving scene 200 of the vehicle 102. In an exemplary embodiment, the data reception module 124 may communicate with the situational awareness analysis module 126 of the situational awareness application 106 to provide artificial intelligence capabilities to conduct multi-modal aggregation of the image data received from the vehicle camera system 110 with the LiDAR data received from the vehicle LiDAR system 112. The situational awareness analysis module 126 may aggregate the image data and the LiDAR data into aggregated driving scene data that is associated with the driving scene 200 to be evaluated further by the situational awareness analysis module 126.

In an exemplary embodiment, the situational awareness analysis module 126 may be configured to access the storage unit 116 of the vehicle 102 to analyze one or more object classifiers that are stored upon the storage unit 116. The one or more object classifiers may include pre-trained object classification data that may be associated with aggregated image coordinates and LiDAR coordinates that may pertain to specific types of static objects 204 (e.g., trees, street signs, poles, guard rails) and specific types of dynamic objects 202 (e.g., additional vehicles, pedestrians, bicyclists) to classify static objects 204 and dynamic objects 202 located within the driving scene 200.

In one configuration, the situational awareness analysis module 126 may be configured to analyze the aggregated driving scene data to extract image coordinates and LiDAR coordinates that pertain to objects 202, 204 that are identified as located within the driving scene 200. The situational awareness analysis module 126 may be configured to process bounding boxes around each of the objects 202, 204 within the driving scene 200. Upon the processing of bounding boxes around each of the objects 202, 204, the situational awareness analysis module 126 may be configured to analyze the one or more object classifiers to compare the image coordinates and LiDAR coordinates that pertain to objects 202, 204 that are located within the driving scene 200 against the pre-trained object classification data to thereby classify the objects 202, 204 as dynamic objects 202 and static objects 204 that are included within each of the bounding boxes that are processed around each of the objects 202, 204 that are located within the driving scene 200 of the vehicle 102. The relative positions of the classified dynamic objects 202 that are tracked and determined with respect to a position of the vehicle 102 within the driving scene 200 may also be determined based on the aggregation of image data and LiDAR data.

The method 300 may proceed to block 308, wherein the method 300 may include receiving alert data that pertains to the alerts that are provided to the driver 108 that are associated with one or more dynamic objects 202. As discussed above, one or more display devices of the vehicle 102 may provide graphical alerts that pertain to dynamic objects 202 that may be located within a particular distance of the vehicle 102, within a blind spot of the driver 108 of the vehicle 102, and/or within a projected path of the vehicle 102. In one or more embodiments, the one or more vehicle systems/control units 120 may be configured to provide alert data to the data reception module 124 that may pertain to the types of alerts and the reasons for such alerts (e.g., presence of a particular dynamic object 202 within a close distance to the vehicle 102) that may pertain to one or more dynamic objects 202 (classified as such at block 306) that may be provided to the driver 108 (e.g., at a period of time during which the dynamic objects 202 have been classified by the situational awareness analysis module 126). The data reception module 124 may be configured to communicate the alert data to the situational awareness analysis module 126. As discussed below, the situational awareness analysis module 126 may be configured to analyze the alert data to determine a level of alert that is provided to the driver 108 of the vehicle 102 that may be attributed to the sensed presence and position of one or more of the dynamic objects 202.

The method 300 may proceed to block 310, wherein the method 300 may include receiving eye gaze data associated with the eye gaze of the driver 108 of the vehicle 102. In an exemplary embodiment, the data reception module 124 may be configured to communicate with the eye gaze sensors 122 of the vehicle 102 to receive gaze data associated with the eye gaze of the driver 108 of the vehicle 102 (e.g., received for a period of time during which the dynamic objects 202 have been classified by the situational awareness analysis module 126).

As discussed, the eye gaze sensors 122 may be configured as one or more cameras located within the vehicle 102 and hardware configured to interpret video or image data sensed by the camera(s) to detect the driver's eye positions within the vehicle 102 in order to determine the driver's gaze points. In an alternate embodiment, the eye gaze sensors 122 may be included as part of a wearable device that may be configured to detect the driver's eye positions within the vehicle 102 in order to determine the driver's gaze points as the vehicle 102 is being operated within the driving scene 200. The driver's gaze points may be included within the eye gaze data and may pertain to the driver's focus with respect to the driver's foveal, parafoveal, and peripheral vision of the driving scene 200 and the driving scene 200. The data reception module 124 may be configured to communicate the eye gaze data to the situational awareness analysis module 126.

Figure 4:
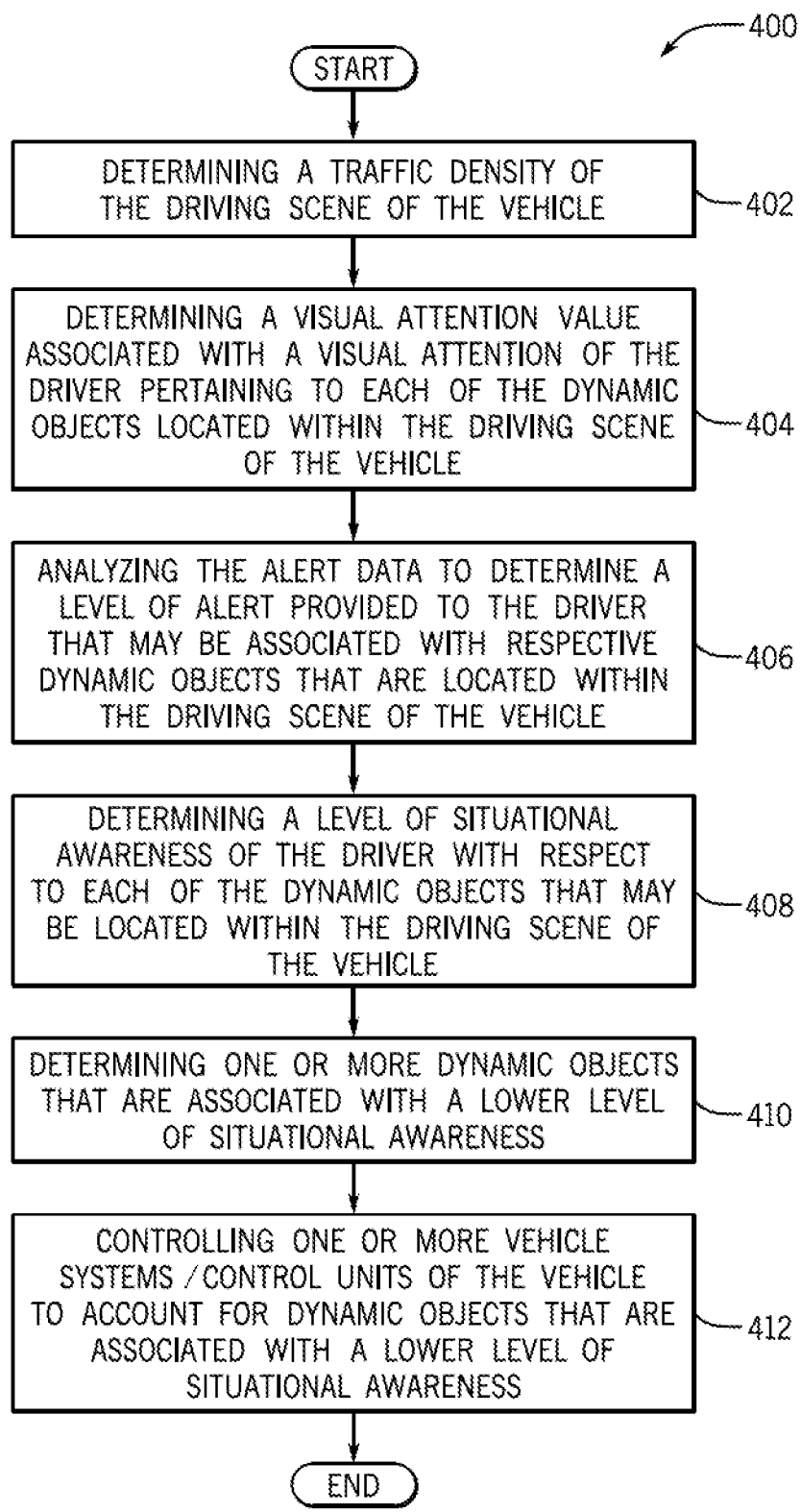
FIG. 4 is a process flow diagram of a method for determining a level of situational awareness of the driver with respect to each of the dynamic objects that are located within the driving scene of the vehicle according to an exemplary embodiment of the present disclosure.

FIG. 4 is a process flow diagram of a method 400 for determining a level of situational awareness of the driver 108 with respect to each of the dynamic objects 202 that are located within the driving scene 200 of the vehicle 102 according to an exemplary embodiment of the present disclosure. FIG. 4 will be described with reference to the components of FIG. 1 though it is to be appreciated that the method 400 of FIG. 4 may be used with other systems/components. The method 400 may begin at block 402, wherein the method 400 may include determining a traffic density of the driving scene 200 of the vehicle 102.

In an exemplary embodiment, the situational awareness analysis module 126 may be configured to analyze data associated with the classified dynamic objects 202 that are located within the driving scene 200 as previously classified by the situational awareness analysis module 126 (as block 306 of the method 300). The situational awareness analysis module 126 may be configured to electronically analyze image data, LiDAR data, and the classified dynamic objects 202 to output a traffic density of the driving scene 200. The traffic density may be output as a value (e.g., range from 0.00 to 10.00) that may pertain to a level of traffic density that may be attributed to the number of dynamic objects 202 that may be located within the driving scene 200. In some configurations, the traffic density may output as a plurality of values that may respectively be associated with a number of dynamic objects 202 that may be located within one or more portions of the driving scene 200 (e.g., respective streets of an intersection).

The method 400 may proceed to block 404, wherein the method 400 may include determining a visual attention value associated with a visual attention of the driver 108 pertaining to each of the dynamic objects 202 located within the driving scene 200 of the vehicle 102. In an exemplary embodiment, the situational awareness analysis module 126 may be configured to analyze eye gaze data along with image data that may be provided by the vehicle camera system 110 and LiDAR data that may be provided by the vehicle LiDAR system 112 to analyze the eye gaze of the driver 108 with respect to the relative position of each of the dynamic objects 202 that may be located within the driving scene 200 with respect to the position of the vehicle 102 within the driving scene 200.

In one embodiment, the situational awareness analysis module 126 may be configured to discretize the driving scene 200 as captured within the image data into a plurality of regions that pertain to a plurality of portions of the driving scene 200. The situational awareness analysis module 126 may additionally be configured to discretize the respective movement of each of the dynamic objects 202 (e.g., vehicles, pedestrians, bicyclists) as previously classified by the situational awareness analysis module 126 within respective discretized regions of the plurality of regions of the driving scene 200. For example, a driving scene 200 that may be configured as a traffic intersection may be discretized into four regions that pertain to four portions that each include one of four cross-streets of the driving scene 200. Upon discretizing the driving scene 200 into four regions, the situational awareness analysis module 126 may further be configured to discretize the respective movement of the dynamic objects 202 that may be traveling within each of the respective regions of the driving scene 200.

In one embodiment, the situational awareness analysis module 126 may be configured to analyze the eye gaze data and determine driver's gaze focus with respect to the driver's foveal, parafoveal, and peripheral vision of the driving scene 200 to track the driver's eye gaze with respect to the discretized movement of each of the dynamic objects 202 located within each of the discretized regions of the driving scene 200. The analysis may include the interpretation of the foveal and parafoveal regions together as a central vision of the driver 108 and the peripheral region as the remaining area of vision. The eye gaze data may be analyzed by determining the driver's eye gaze pertaining to the one or more dynamic objects 202 that may be located within the driving scene 200 based on the analysis of driver's central vision with respect to respective discretize regions of the driving scene 200 and the relative positions of one or more dynamic objects 202 that may be traveling within the respective discretize regions of the driving scene 200 from the perspective of the driver 108 seated within the vehicle 102.

In one embodiment, upon tracking the driver's eye gaze, the situational awareness analysis module 126 may be configured to analyze the position of each of the dynamic objects 202, image data, LiDAR data, and eye gaze data to determine eye gaze object characteristics that may be determined based on the tracking of the driver's eye gaze with respect to the discretized movement of each of the dynamic objects 202 within each of the discretized regions of the driving scene 200. The eye gaze object characteristics may include, but may not be limited to, a distance with respect to one or more respective dynamic objects 202 that may be located within a respective region of the driving scene 200 that are included within the central vision of the driver 108 within one or more time steps, the number of dynamic objects 202 that may be included within the central vision of the driver 108 at one or more time steps, a fixation time of the central vision of the driver 108 with respect to the one or more dynamic objects 202 that may be located within respective discretized regions of the driving scene 200, the relative sizes of the one or more dynamic objects 202 that may be included within the central vision of the driver 108 at one or more time steps, and/or additional attention capturing physical characteristics (e.g., color, shape, speed, trajectory) that may be associated with respect to one or more respective dynamic objects 202 that may be located within the driving scene 200 that are included within the central vision of the driver 108 within one or more time steps.

In one embodiment, based on analysis of the eye gaze object characteristics, the situational awareness analysis module 126 may be configured to determine a visual attention value that may pertain to a level of attention allocation that the driver 108 of the vehicle 102 may place upon each dynamic object 202 that may be located and traveling within the driving scene 200 of the vehicle 102 at one or more time steps.

The method 400 may proceed to block 406, wherein the method 400 may include analyzing the alert data to determine a level of alert provided to the driver 108 that may be associated with respective dynamic objects 202 that are located within the driving scene 200 of the vehicle 102. As discussed above (at block 308), the data reception module 124 may receive alert data that pertains to the alerts that are provided to the driver 108 that are associated with one or more dynamic objects 202. The data reception module 124 may be configured to communicate the alert data to the situational awareness analysis module 126.

The situational awareness analysis module 126 may be configured to analyze the alert data to determine a level of alert as a value (e.g., numeric value between 0.00 and 10.00) that may be associated with the presence of any alerts that may be provided to the driver 108 that may be attributed to the presence and position of one or more of the dynamic objects 202. In particular, the alert data may be analyzed by the situational awareness analysis module 126 to determine a number of alerts that may be provided to the driver 108 of the vehicle 102 and a duration of such alerts that may be attributed to the sensed presence and position of one or more of the dynamic objects 202 within one or more past time steps (t, t-1, t-2, t-n). In one embodiment, the number of alerts (e.g., 0-n) and duration of alerts that have been provided to the driver 108 associated with each of the dynamic objects 202 that may be located within the driving scene 200 within one or more past time steps may be output as the level of alert. The level of alert may pertain to the presence of any alerts that may be provided to the driver 108 with respect to any particular dynamic objects 202 that may be located within the driving scene 200 based on sensor-based data received by the vehicle camera system 110, the vehicle LiDAR system 112, and/or one or more vehicle systems/control units 120. Stated differently, the level of alert may be associated with an enhancement of the driver's attention that may be attributed to alerts that notify the driver 108 of the presence and position of one or more particular dynamic objects 202 that may be located within the driving scene 200.

The method 400 may proceed to block 408, wherein the method 400 may include determining a level of situational awareness of the driver 108 with respect to each of the dynamic objects 202 that may be located within the driving scene 200 of the vehicle 102. In an exemplary embodiment, the situational awareness analysis module 126 may be configured to analyze the traffic density of the driving scene 200 of the vehicle 102 (determined at block 402), the visual attention value associated with each of the dynamic objects 202 located within the driving scene 200 (determined at block 404), and the level of alert provided to the driver 108 that may be associated with respective dynamic objects 202 located within the driving scene 200 (determined at block 406).

In particular, the situational awareness analysis module 126 may be configured to weigh and aggregate the traffic density (value), the visual attention value that pertains to each dynamic object 202 located within the driving scene 200, and the level of alert (value) that pertains to each dynamic object 202 that is located within the driving scene 200 to calculate a level of situational awareness of the driver 108 that is attributed to each of the dynamic objects 202 that are located within the driving scene 200 of the vehicle 102. The level of situational awareness pertains to the driver's awareness and attentiveness to each dynamic object 202 that is located within the driving scene 200 to provide an indicator as to how scene complexity may impact the driver's awareness with respect to each dynamic object 202 that is traveling within the driving scene 200 of the vehicle 102.

With continued reference to FIG. 4, upon determining the level of situational awareness of the driver 108 that is attributed to each of the dynamic objects 202, the method 400 may proceed to block 410, wherein the method 400 may include determining one or more dynamic objects 202 that are associated with a lower level of situational awareness. In an exemplary embodiment, the situational awareness analysis module 126 may process a situational awareness threshold value that may be associated with a requisite level of situational awareness that may be used to determine which dynamic objects 202 that are to be considered when providing vehicle controls to account for dynamic objects 202 that the driver 108 of the vehicle 102 may not be highly aware of within the driving scene 200.

In one embodiment, the situational awareness threshold value may be processed as a dynamic value by the situational awareness analysis module 126. In particular, the situational awareness analysis module 126 may be configured to analyze dynamic data provided by the vehicle dynamic sensors 114, image data provided by the vehicle camera system 110, LiDAR data provided by the vehicle LiDAR system 112, and system data provided by one or more of the vehicle systems/control units 120 that are provided at one or more time steps to determine particular vehicle dynamics of the vehicle 102, a type of driving scene 200, and driving conditions of the driving scene 200 of the vehicle 102 at the one or more time steps.

The situational awareness analysis module 126 may be configured to process the situational awareness threshold value as a dynamic value that may change at particular time steps based on the particular vehicle dynamics of the vehicle 102 (e.g., speed, braking, steering angle, etc.), the type of driving scene 200 of the vehicle 102 (e.g., highway, intersection, two-lane road, off-ramp), and/or the driving conditions (e.g., weather, traffic density, road conditions) of the driving scene 200 of the vehicle 102. As a dynamic value, the situational awareness threshold value may be utilized to determine the situational awareness of the driver 108 of the vehicle 102 that may subjectively apply to situational attributes that may be associated with the operation of the vehicle 102, the driving scene 200, and/or driving conditions of the driving scene 200 at a particular point in time.

In particular, upon processing the situational awareness threshold value, the situational awareness analysis module 126 may be configured to compare the level of situational awareness of the driver 108 that is attributed to each of the dynamic objects 202 to the situational awareness threshold value to determine if the driver 108 has a lower situational awareness with respect to any of the dynamic objects 202 within the driving scene 200 than the situational awareness threshold value. If it is determined that the driver 108 has a lower situational awareness that pertains to the presence of particular dynamic objects 202 within the driving scene 200, the situational awareness analysis module 126 may determine and output data associated with the classification, position, locations, and attributes associated with one or more dynamic objects 202 that are associated with the lower level of situational awareness than the situational awareness threshold value to the vehicle control module 128 of the situational awareness application 106.

The method 400 may proceed to block 412, wherein the method 400 may include controlling one or more vehicle systems/control units 120 of the vehicle 102 to account for dynamic objects 202 that are associated with a lower level of situational awareness. In an exemplary embodiment, upon receiving data associated with the classification, position, locations, and attributes associated with one or more dynamic objects 202 that are associated with the lower level of situational awareness than the situational awareness threshold value, the vehicle control module 128 may be configured to analyze the data and output one or more commands to the vehicle systems/control units 120 to control one or more operations of one or more components of the vehicle 102.

In one embodiment, the vehicle control module 128 may be configured to send one or more commands to the vehicle systems/control units 120 to operably control the head unit of the vehicle 102 which include one or more display devices to situationally and selectively utilize ADAS within the vehicle 102 to alert the driver 108 of one or more dynamic objects 202 (e.g., additional vehicles, pedestrians, bicyclists, etc.) that may be located within the driving scene 200 that the driver 108 may have a lower level of situational awareness than the situational awareness threshold value of as the driver 108 operates the vehicle 102 within the driving scene 200. Accordingly, upon determining a lower level of situational awareness of the driver 108 with respect to one or more particular dynamic objects 202 by the situational awareness analysis module 126, the vehicle control module 128 may be configured to operably control situational utilization of the ADAS of the vehicle 102 to provide one or more alerts and/or warnings that may pertain to the presence and/or positions of one or more dynamic objects 202 to account for the dynamic objects 202 that may be associated with a lower level of situational awareness with respect to the driver's awareness of the respective dynamic objects 202 within the driving scene 200.

In particular, the vehicle control module 128 may be configured to operably control one or more display devices to provide respective graphical user interfaces that include one or more graphical alert warnings that are displayed within the vehicle 102 to highlight one or more dynamic objects 202 that may be located at a relative predetermined position of the vehicle 102 (e.g., in an adjacent lane, within a threshold distance in the front, back, or sides of the vehicle 102), that may be located within a projected pathway of the vehicle 102, and that may be associated with the lower situational awareness of the driver 108. This functionality may additionally ensure that unnecessary warnings that may increase the driver's workload during operation of the vehicle 102 are not provided since ADAS warnings are situationally and selectively provided as required to account for driving scene complexity, lower situational awareness of particular dynamic objects 202, and the properties and positions of dynamic objects 202 that are located within the driving scene 200 of the vehicle 102 to provide enhanced driver situational awareness of such dynamic objects 202.

In some embodiments, the vehicle control module 130 may be configured to output vehicle autonomous commands that may be associated with driving parameters to autonomously control the operation of the vehicle 102 to account for one or more dynamic objects 202 that may be located at a relative predetermined position of the vehicle 102, that may be located within a projected pathway of the vehicle 102, and that may be associated with the lower situational awareness of the driver 108. In one embodiment, the vehicle control module 130 may be configured to communicate the autonomous control commands to the vehicle autonomous controller 118 of the vehicle 102. The vehicle autonomous controller 118 may thereby operably control the vehicle systems/control units 120 of the vehicle 102 to autonomously operate the vehicle 102 according to the autonomous control commands to provide one or more driving maneuvers to account for the one or more dynamic objects 202 that may be located at a relative predetermined position of the vehicle 102, that may be located within a projected pathway of the vehicle 102, and that may be associated with the lower situational awareness of the driver 108.

In particular, the vehicle 102 may be operably controlled to autonomously operate (e.g., with the application 106 of a particular speed, acceleration, steering angle, throttle angle, braking force, etc.) according to the autonomous control commands that adhere to dynamic constraints of the vehicle 102 to account for such dynamic objects 202. Accordingly, the vehicle 102 may be operated to drive within the driving scene 200 without overlap with such dynamic objects 202 while simultaneously optimizing speed and steering, minimizing control effort associated with autonomous dynamic parameters of the vehicle 102.

Figure 5:
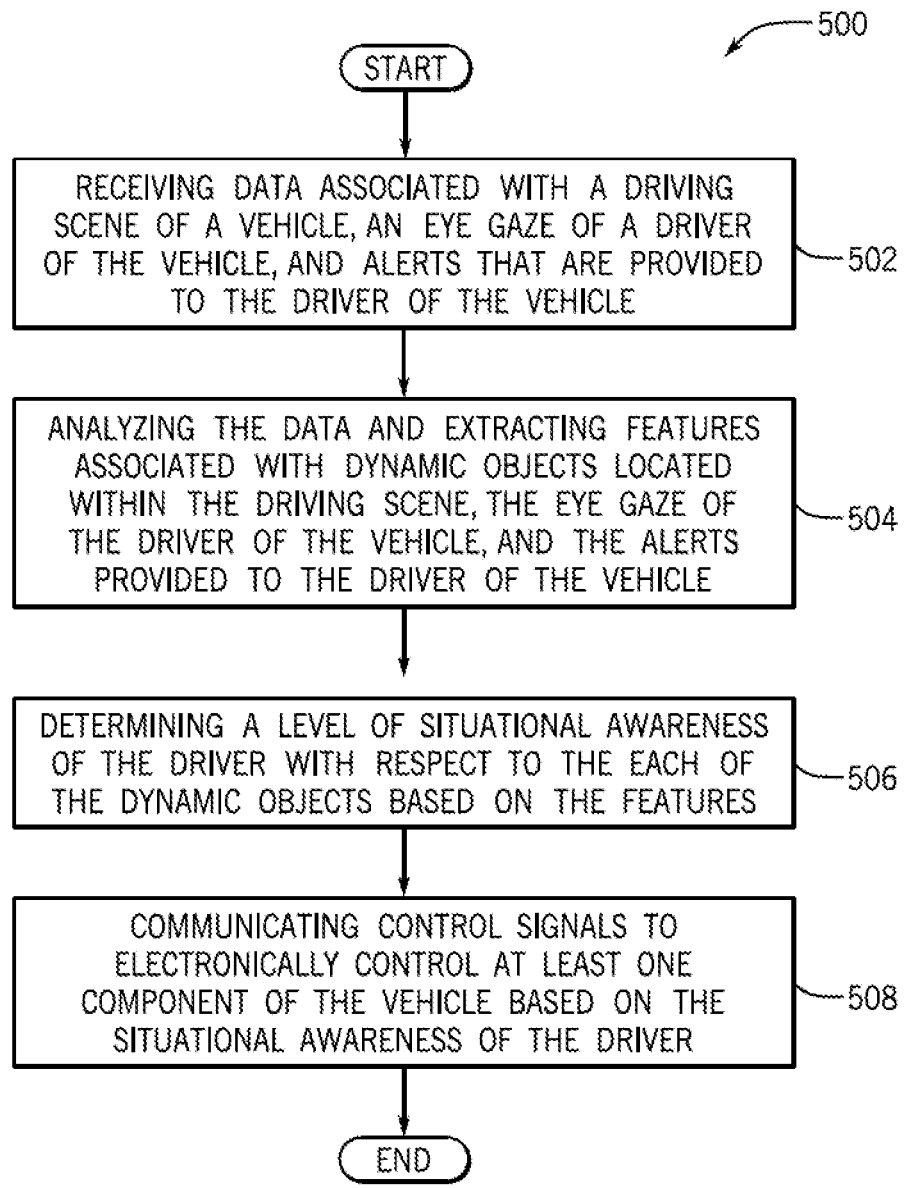
FIG. 5 is a process flow diagram of a method for determining object-wise situational awareness according to an exemplary embodiment of the present disclosure.

FIG. 5 is a process flow diagram of a method 500 for determining object-wise situational awareness according to an exemplary embodiment of the present disclosure. FIG. 5 will be described with reference to the components of FIG. 1 though it is to be appreciated that the method 500 of FIG. 5 may be used with other systems/components. The method 500 may begin at block 502, wherein the method 500 may include receiving data associated with a driving scene 200 of a vehicle 102, an eye gaze of a driver 108 of the vehicle 102, and alerts that are provided to the driver 108 of the vehicle 102.

The method 500 may proceed to block 504, wherein the method 500 may include analyzing the data and extracting features associated with dynamic objects 202 located within the driving scene 200, the eye gaze of the driver 108 of the vehicle 102, and the alerts provided to the driver 108 of the vehicle 102. The method 500 may proceed to block 506, wherein the method 500 may include determining a level of situational awareness of the driver 108 with respect to the each of the dynamic objects 202 based on the features. The method 500 may proceed to block 508, wherein the method 500 may include communicating control signals to electronically control at least one component of the vehicle 102 based on the situational awareness of the driver 108.

It should be apparent from the foregoing description that various exemplary embodiments of the disclosure may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein. A machine-readable storage medium may include any mechanism for storing information in a form readable by a machine, such as a personal or laptop computer, a server, or other computing device. Thus, a non-transitory machine-readable storage medium excludes transitory signals but may include both volatile and non-volatile memories, including but not limited to read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

It will be appreciated that various implementations of the above-disclosed and other features and functions, or alternatives or varieties thereof, may be desirably combined into many other different systems or applications. Also, that various presently unforeseen or unanticipated alternatives, modifications, variations or improvements therein may be subsequently made by those skilled in the art which are also intended to be encompassed by the following claims.

The invention claimed is:

1. A computer-implemented method for determining object-wise situational awareness comprising:
   receiving data associated with a driving scene of a vehicle, an eye gaze of a driver of the vehicle, and alerts that are provided to the driver of the vehicle;
   analyzing the data and extracting features associated with dynamic objects located within the driving scene, the eye gaze of the driver of the vehicle, and the alerts provided to the driver of the vehicle;
   determining a level of situational awareness of the driver with respect to the each of the dynamic objects based on the features that pertain to a traffic density of the driving scene, a level of attention placed upon each dynamic object by the driver of the vehicle, and a level of the alerts that are provided to the driver of the vehicle; and
   communicating control signals to electronically control at least one component of the vehicle based on the situational awareness of the driver.

2. The computer-implemented method of claim 1, wherein analyzing the data and extracting the features includes performing multimodal aggregation on received image data and received LIDAR data that pertains to objects that are located within the driving scene to classify the objects located within the driving scene as the dynamic objects.

3. The computer-implemented method of claim 2, wherein analyzing the data and extracting the features includes analyzing image data, the LIDAR data, and the dynamic objects to output the traffic density of the driving scene of the vehicle, wherein the traffic density is output as a number of dynamic objects that are located within the driving scene.

4. The computer-implemented method of claim 3, wherein analyzing the data and extracting the features includes determining a visual attention value associated with a visual attention of the driver pertaining to each of the dynamic objects based on analyzing the image data, the LiDAR data, and eye gaze data that is associated with the eye gaze of the driver of the vehicle.

5. The computer-implemented method of claim 4, wherein determining the visual attention value includes discretizing the driving scene into a plurality of regions and discretizing respective movement of each of the dynamic objects within respective discretized regions of the plurality of regions.

6. The computer-implemented method of claim 5, wherein determining the visual attention value includes analyzing the eye gaze data and determining a gaze focus of the driver with respect to the driver's foveal, parafoveal, and peripheral vision of the driving scene to track the driver's eye gaze with respect to the discretized movement of each of the dynamic objects located within each of the plurality of regions of the driving scene, wherein the visual attention value pertains to the level of attention that the driver of the vehicle places upon each said dynamic object that is located within the driving scene of the vehicle at one or more time steps.

7. The computer-implemented method of claim 6, wherein analyzing the data and extracting features includes analyzing the alerts that are provided to the driver of the vehicle that are associated with respective dynamic objects to determine the level of alerts that is associated with a presence of alerts that are attributed to the presence and position of particular dynamic objects based on sensor-based data received by components of the vehicle.

8. The computer-implemented method of claim 7, wherein determining the level of situational awareness includes analyzing the traffic density of the driving scene, the visual attention value that pertains to the level of attention placed upon each dynamic object, and the level of alert that is associated with the presence of alerts that are attributed to particular dynamic objects, wherein the traffic density, the visual attention value that pertains to each dynamic object, and the level of alert that pertains to each dynamic object is weighted and aggregated to calculate the level of situational awareness of the driver that is attributed to each of the dynamic objects that are located within the driving scene of the vehicle.

9. The computer-implemented method of claim 1, wherein communicating the control signals to electronically control the at least one component includes determining at least one dynamic object that is associated with a lower level situational awareness than a situational awareness threshold value and controlling advanced driver assistance systems of the vehicle to alert the driver of the at least one dynamic object that is associated with the lower level situational awareness.

10. A system for determining object-wise situational awareness comprising:
a memory storing instructions when executed by a processor cause the processor to:
receive data associated with a driving scene of a vehicle, an eye gaze of a driver of the vehicle, and alerts that are provided to the driver of the vehicle;
analyze the data and extracting features associated with dynamic objects located within the driving scene, the eye gaze of the driver of the vehicle, and the alerts provided to the driver of the vehicle;
determine a level of situational awareness of the driver with respect to the each of the dynamic objects based on the features that pertain to a traffic density of the driving scene, a level of attention placed upon each dynamic object by the driver of the vehicle, and a level of the alerts that are provided to the driver of the vehicle; and
communicate control signals to electronically control at least one component of the vehicle based on the situational awareness of the driver.

11. The system of claim 10, wherein analyzing the data and extracting the features includes performing multimodal aggregation on received image data and received LIDAR data that pertains to objects that are located within the driving scene to classify the objects located within the driving scene as the dynamic objects.

12. The system of claim 11, wherein analyzing the data and extracting the features includes analyzing image data, the LIDAR data, and the dynamic objects to output the traffic density of the driving scene of the vehicle, wherein the traffic density is output as a number of dynamic objects that are located within the driving scene.

13. The system of claim 12, wherein analyzing the data and extracting the features includes determining a visual attention value associated with a visual attention of the driver pertaining to each of the dynamic objects based on analyzing the image data, the LiDAR data, and eye gaze data that is associated with the eye gaze of the driver of the vehicle.

14. The system of claim 13, wherein determining the visual attention value includes discretizing the driving scene into a plurality of regions and discretizing respective movement of each of the dynamic objects within respective discretized regions of the plurality of regions.

15. The system of claim 14, wherein determining the visual attention value includes analyzing the eye gaze data and determining a gaze focus of the driver with respect to the driver's foveal, parafoveal, and peripheral vision of the driving scene to track the driver's eye gaze with respect to the discretized movement of each of the dynamic objects located within each of the plurality of regions of the driving scene, wherein the visual attention value pertains to the level of attention that the driver of the vehicle places upon each said dynamic object that is located within the driving scene of the vehicle at one or more time steps.

16. The system of claim 15, wherein analyzing the data and extracting features includes analyzing the alerts that are provided to the driver of the vehicle that are associated with respective dynamic objects to determine the level of alert that is associated with a presence of alerts that are attributed to the presence and position of particular dynamic objects based on sensor-based data received by components of the vehicle.

17. The system of claim 16, wherein determining the level of situational awareness includes analyzing the traffic density of the driving scene, the visual attention value that pertains to the level of attention placed upon each dynamic object, and the level of alert that is associated with the presence of alerts that are attributed to particular dynamic objects, wherein the traffic density, the visual attention value that pertains to each dynamic object, and the level of alert that pertains to each dynamic object is weighted and aggregated to calculate the level of situational awareness of the driver that is attributed to each of the dynamic objects that are located within the driving scene of the vehicle.

18. The system of claim 10, wherein communicating the control signals to electronically control the at least one component includes determining at least one dynamic object that is associated with a lower level situational awareness than a situational awareness threshold value and controlling advanced driver assistance systems of the vehicle to alert the driver of the at least one dynamic object that is associated with the lower level situational awareness.

19. A non-transitory computer readable storage medium storing instructions that when executed by a computer, which includes a processor perform a method, the method comprising:
  receiving data associated with a driving scene of a vehicle, an eye gaze of a driver of the vehicle, and alerts that are provided to the driver of the vehicle;
  analyzing the data and extracting features associated with dynamic objects located within the driving scene, the eye gaze of the driver of the vehicle, and the alerts provided to the driver of the vehicle;
  determining a level of situational awareness of the driver with respect to the each of the dynamic objects based on the features that pertain to a traffic density of the driving scene, a level of attention placed upon each dynamic object by the driver of the vehicle, and a level of the alerts that are provided to the driver of the vehicle; and
  communicating control signals to electronically control at least one component of the vehicle based on the situational awareness of the driver.

20. The non-transitory computer readable storage medium of claim 19, wherein communicating the control signals to electronically control the at least one component includes determining at least one dynamic object that is associated with a lower level situational awareness than a situational awareness threshold value and controlling advanced driver assistance systems of the vehicle to alert the driver of the at least one dynamic object that is associated with the lower level situational awareness.

* * * * *